United States Patent [19]
Daniels

[11] Patent Number: 5,823,509
[45] Date of Patent: Oct. 20, 1998

[54] DIAPHRAGM VALVE WITH MEANS FOR ADJUSTABLY SETTING THE MAXIUM VALVE OPENING

[75] Inventor: James R. Daniels, Lititz, Pa.

[73] Assignee: Amcast Industrial Corporation, Dayton, Ohio

[21] Appl. No.: 892,260

[22] Filed: Jul. 11, 1997

[51] Int. Cl.⁶ .................................................. F16K 31/00
[52] U.S. Cl. ...................................... 251/335.2; 251/285
[58] Field of Search .................................. 251/282, 285, 251/335.2

[56] References Cited

U.S. PATENT DOCUMENTS

| | | | |
|---|---|---|---|
| 2,977,981 | 4/1961 | Jarrett | 251/285 |
| 4,776,562 | 10/1988 | Kalaskie et al. | 251/63.4 |
| 5,048,554 | 9/1991 | Kremer | 137/69 |
| 5,516,078 | 5/1996 | Wellener, III et al. | 251/335.2 |

FOREIGN PATENT DOCUMENTS 229161  11/1958  Australia ........................... 251/335 A

*Primary Examiner*—A. Michael Chambers
*Attorney, Agent, or Firm*—Richard V. Westerhoff; Eckert Seamans Cherin & Mellott, LLC

[57] ABSTRACT

A diaphragm valve has an adjustment device for precisely setting maximum valve lift. A bushing threaded into the bonnet clamping the diaphragm within the valve body forms at its inward end an axially facing engagement surface which is engaged by an outwardly, axially facing engagement surface formed by a shoulder on the valve stem. The bushing can be threaded in or out without disassembling the entire valve to adjust the maximum lift to the precise setting desired. The bushing is then locked in place such as by a thread adhesive. Alternatively, the bushing can be threaded on the valve stem and be provided with a radial flange forming the axially facing engagement surface which engages a shoulder on the bonnet.

14 Claims, 3 Drawing Sheets

DIAPHRAGM VALVE WITH MEANS FOR ADJUSTABLY SETTING THE MAXIUM VALVE OPENING

BACKGROUND OF THE INVENTION

1. Field of the Invention

This invention relates to diaphragm valves and more particularly to such a valve having a mechanism for accurately setting the maximum lift or opening of the valve.

2. Background Information

Diaphragm valves utilize a flexible disk to seal a valve chamber while allowing movement of the valve assembly to open and close the valve. One type of diaphragm valve is used for gas cylinder valves and line valves for compressed gases. An example of such a diaphragm valve is disclosed in U.S. Pat. No. 5,516,078. One application of such valves is to control the flow of toxic gases, such as are used in making integrated circuits and for other applications. In such valves, the diaphragm is typically made of several laminations of a flexible metal to provide the integrity required. High pressure systems also require such diaphragms. Typically, the diaphragm is in a relaxed state with the valve closed. Opening the valve deforms the diaphragm. The nominal maximum lift of the valve described in U.S. Pat. No. 5,516,078 can be quite small, for example, on the order of 0.013 (+/−0.001) inch. The accumulated tolerances of the components in the valve are very significant when compared to this nominal lift. Thus, the flow coefficient, $C_v$, is very sensitive to changes in valve lift. If the lift is inadequate, the flow is greatly reduced and fill time through the valve is significantly increased. On the other hand, if the lift is too great, the diaphragm is overstressed with each cycle of the valve and the life of the diaphragm and, therefore, the valve, is reduced.

Previous designs have relied on shims for accurate control of seat position and lift. Assemblers must estimate how many shims and of what thickness to use. Since they are not able to determine the lift until the valve is assembled, if they are incorrect in their estimate, they have to disassemble the valve and change the shim selection. This process must be repeated until proper lift is achieved.

There is a need therefore for an improved diaphragm valve in which the maximum lift can be precisely set more easily.

There is a further need for such an improved diaphragm valve in which the maximum lift can be adjusted after the valve has been assembled.

There is another need for such an improved diaphragm valve in which the maximum lift can be continuously adjusted to provide more precise setting.

SUMMARY OF THE INVENTION

These needs and others are satisfied by the invention which is directed to a diaphragm valve with a settable maximum lift which can be easily and precisely adjusted and then locked in place. The invention is applied to a diaphragm valve having a valve assembly movable axially in an axial bore in a valve body toward and away from a valve seat to open and close the valve. This valve assembly includes a diaphragm extending across the axial bore to form a valve chamber through which inlet and outlet passages communicate. The valve assembly also includes a valve stem extending axially in the axial bore outside the valve chamber. It further includes adjustment means comprising a moveable member adjustably positioned axially on either the valve stem or within the axial bore of the valve body and having first engagement means. The other of the valve stem and the valve body has second engagement means. These first and second engagement means engage to limit withdrawal of the valve assembly away from the valve inlet and thereby set the maximum lift of the valve. Preferably, the moveable member is a threaded bushing threaded either onto the valve stem or into the bore in the valve body so that it can be adjustably positioned. Also preferably, the first and second engagement means comprise confronting axially facing shoulders. In the case of the threaded bushing, the shoulder can be the end face of the bushing.

In the most preferred embodiment of the invention, the threaded bushing is threaded into a bonnet which in turn is threaded into the axial bore and clamps the diaphragm against a ledge formed by a counterbore. Once the maximum lift has been set by threading the bushing to the required position, the bushing is locked in place, preferably by a thread adhesive.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
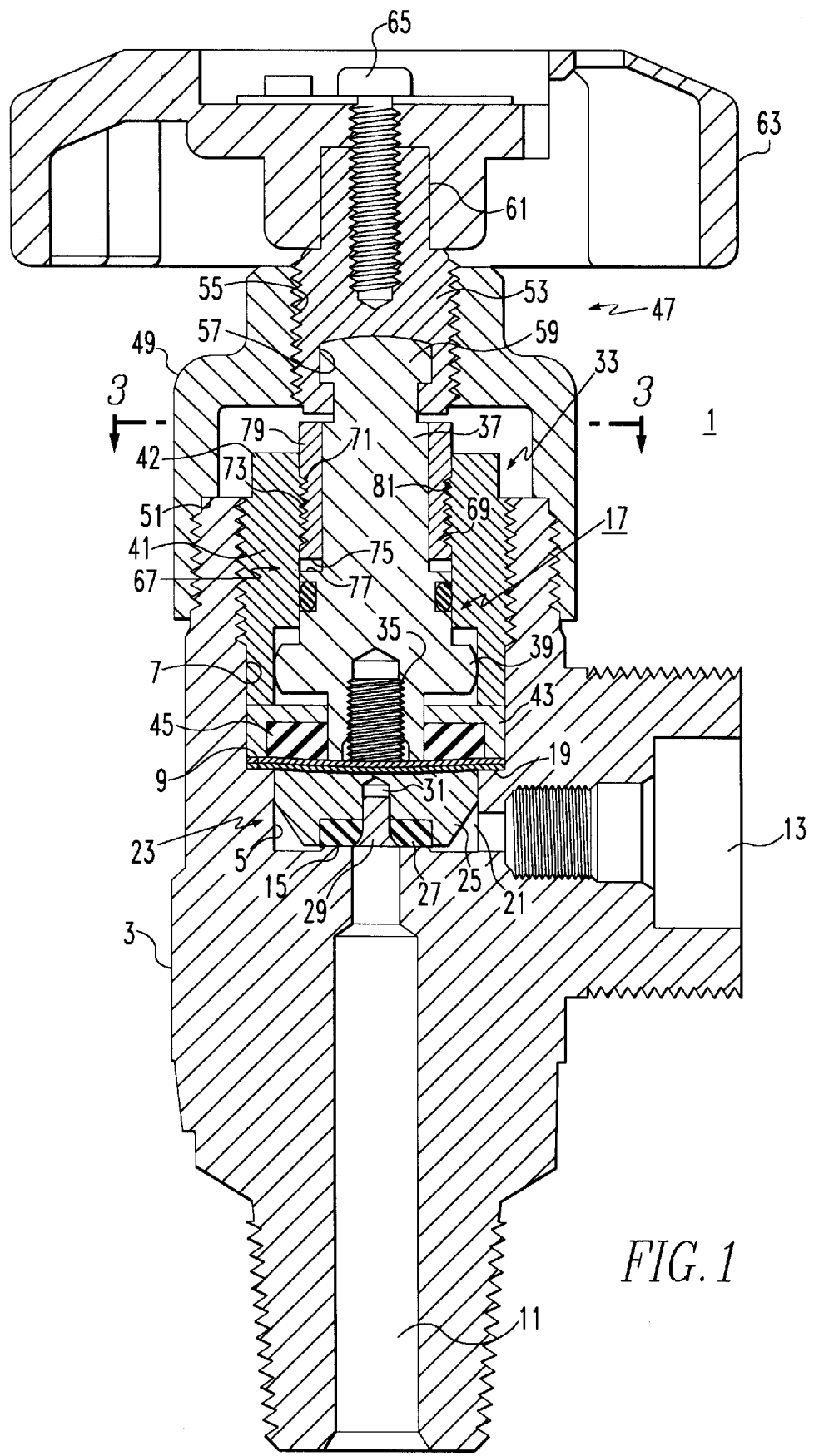
FIG. 1 is a longitudinal section through a diaphragm valve in accordance with the invention shown in the closed position.

Referring to the drawings, the diaphragm valve 1 includes a valve body 3 having an axial bore 5 with a counterbore 7 forming an annular ledge 9. An axially extending inlet passage 11 and a radially extending outlet passage 13 communicate through the axial bore 5. A raised valve seat 15 is formed around the inlet passage 11. A valve assembly 17 is axially slidable in the axial bore 5 toward and away from the valve seat to open and close the valve. This valve assembly 17 includes a diaphragm 1 which is seated on the annular ledge 9 and clamped in place in a manner to be described to form a valve chamber 21 in the lower portion of the axial bore 5.

The valve assembly 17 further includes a seat assembly 23 in the valve chamber 21 which includes a seat holder 25 and a seat disc 27 which is held in a recess in the bottom of the seat holder by a pin 29 which is press fit into a blind hole 31 in the seat holder 25. The resilient seat disc 27 engages the seat 15 to close the valve.

The valve assembly 17 also includes an outer stem assembly 33. In the preferred embodiment of the invention shown, the diaphragm 19, seat holder 25 and stem assembly 33 are tied together as described in U.S. Pat. No. 5,516,078. This is accomplished by welding. The stem assembly includes a stud 35 and a stem 37. The seat holder 25, diaphragm 19, and the stud 35 are welded together through the blind bore 31 in the seat holder 25. An additional weld is provided around the periphery of the stud 35. Preferably the weld is a YAG laser weld.

With the stud 35 diaphragm 19 and seat holder 25 fused together as one piece, the stem 37 is threaded down onto the stud and clamps the diaphragm against the seat holder 25 to isolate the welds from the stresses generated in the diaphragm as the valve assembly 17 moves within the axial bore 5. The lower end of the stem 37 is provided with a hexagonal flange 39 (in a plane perpendicular to FIG. 1, see FIG. 4) so that it may be engaged by a wrench for threading onto the stud 35.

Figure 3:
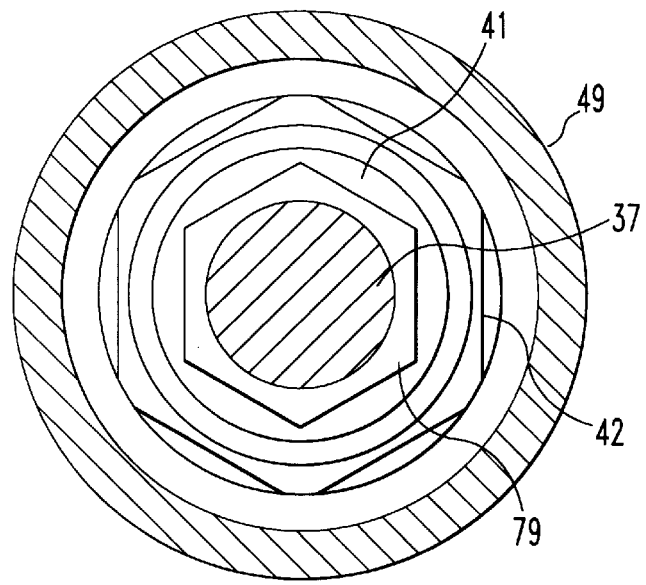
FIG. 3 is a transverse section through the valve of FIG. 1 taken along the line 3—3.

The valve body 3 is provided with a bonnet 41 with a hexagonal head 42 (see FIG. 3) which is threaded down into the counterbore 7 and bears against a metal cup 43 which clamps the diaphragm against the annular ledge 9. The cup 43 holds a resilient ring 45 which provides backing for the diaphragm 19.

The valve assembly 17 is moved axially within the valve body 3 through the bonnet 41 by an actuator. In the embodiment of the invention shown, the actuator is a manually operated handwheel assembly 47. The handwheel assembly 47 includes a handwheel adaptor 49 which is threaded down over the valve body 3 and has a shoulder 51 which abuts on the end of the valve body 3. A handwheel stem 53 is threaded into a central bore 55 in the handwheel adaptor 49 and has a transverse slot 57 which is engaged by a T connector 59 on the top of the stem 37. The handwheel stem 53 has a square upper end 61 on which a handwheel 63 is seated and retained in place by a screw 65.

Figure 2:
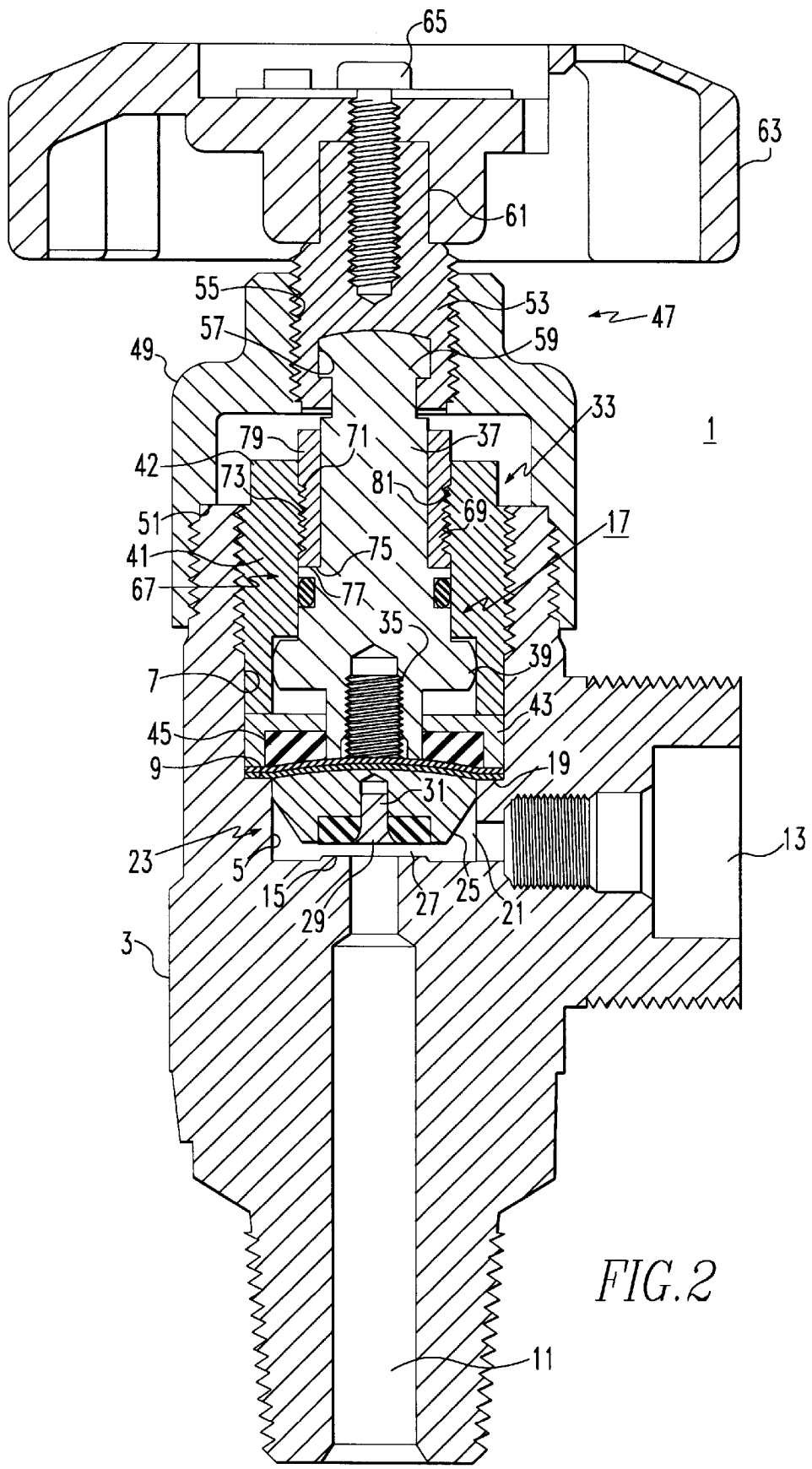
FIG. 2 is similar to FIG. 1 shown with the valve in the full open position.

The valve is operated by rotation of the handwheel 63. Counterclockwise rotation causes the handwheel stem 53 to thread upward relative to the handwheel adaptor 49. This results in axial withdraw of the valve assembly 17 away from the valve seat 15 to open the valve to the position shown in FIG. 2. With the stem 37 connected to the handwheel stem 53 by the T connector 59, the stem is lifted upward by, but does not rotate with, the handwheel stem 53. The valve could be alternatively operated automatically by a pneumatic actuator such as that disclosed in U.S. Pat. No. 4,776,562.

The maximum lift or opening of the valve can be measured by inserting a probe through the inlet passage 11. In a particular application, the maximum opening or lift of the valve is 0.013 (+/−0.001) inch. It can be appreciated that the accumulation of tolerances in the various parts can be a significant part of this nominal lift.

In order to provide for precise setting of the maximum lift of the valve, an adjustment device 67 provides an easily installed and operated mechanism for setting the maximum amount that the valve assembly 17 can be withdrawn from the valve seat. In particular, this adjustment device 67 sets the maximum amount that the stem 37 can be raised relative to the bonnet 41 and therefore relative to the valve body 3. Accordingly, the adjustment device 67 includes a bushing 69 having external threads 71 which engage internal threads 73 on the bonnet 41. The bottom end of the bushing 75 forms an axially facing first engagement surface or shoulder 75. A shoulder 77 on the stem 37 forms a second axially facing engagement surface. As the handwheel 63 is rotated counterclockwise to raise the valve assembly, these confronting first and second axially facing engagement surfaces 75 and 77 come into contact to form a stop for upward movement of the stem 37 thereby setting the maximum lift of the valve. With the handwheel adaptor removed, the valve assembly is raised until the shoulder 77 on the stem 37 engages the end 75 of the bushing and the maximum lift is measured through the inlet passage 11. If adjustment in the maximum lift is required, a wrench can be used to engage the hexagonal head 79 on the upper end of the bushing 69 which extends above the bonnet 41 (see FIG. 3). This bushing 69 can be rotated either clockwise or counterclockwise to decrease or increase, respectively, the maximum lift. Thus, it can be seen that the maximum lift can be precisely, continuously adjusted to set the desired valve without disassembling the entire valve as was previously required. Once the precise maximum lift has been set, the bushing 69 can be locked against further rotation. In the preferred embodiment of the invention, the bushing is locked in place by applying a thread adhesive 81 to the threads 71 on the bushing. Typical thread adhesives have a cure time which allows for the adjustments required to precisely set the maximum lift.

Figure 4:
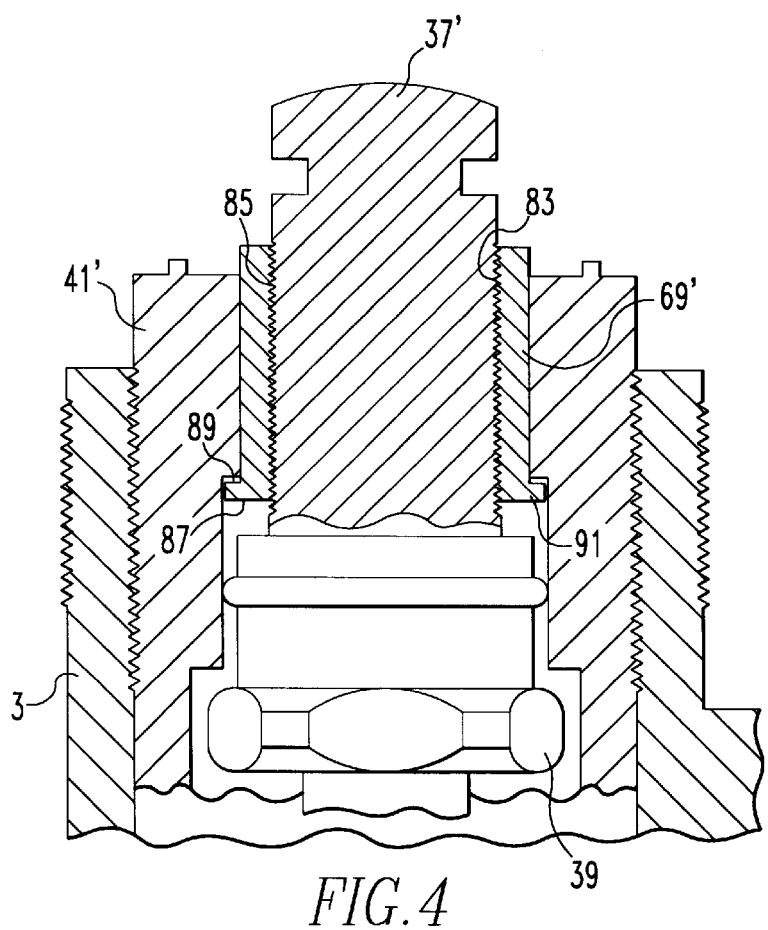
FIG. 4 is a fragmentary longitudinal section through a diaphragm valve in accordance with another embodiment of the invention.

It can be appreciated that as shown in FIG. 4, the bushing 69' can be provided with internal threads 83 which thread onto external threads 85 on the stem 37'. In this embodiment, the lower end of the bushing is provided with a radial flange 87 which forms the axially facing first engagement surface 89 which engages a downwardly axially facing surface formed by the shoulder in 91 on the bonnet 41'.

While specific embodiments of the invention have been described in detail, it will be appreciated by those skilled in the art that various modifications and alternatives to those details could be developed in light of the overall teachings of the disclosure. Accordingly, the particular arrangement disclosed are meant to be illustrative only and not limiting as to the scope of invention which is to be given the full breath of the claims appended and any and all equivalents thereof.

What is claimed is:

1. A diaphragm valve with settable maximum lift, said valve comprising:

a valve body having an axial bore, an inlet passage axially extending from said axial bore and forming therewith a valve seat, and an outlet passage also communicating with said axial bore;

a valve assembly moveable in said axial bore toward and away from said valve seat to open and close said valve, said valve assembly including a diaphragm extending across said axial bore and forming a valve chamber through which said inlet and outlet passages communicate, and a valve stem extending axially in said axial bore outside said valve chamber; and adjustment means comprising a moveable member adjustably positioned axially on one of said valve stem and said valve body and having first engagement means, the other of said valve stem and valve body having second engagement means, said first and second engagement means engaging to limit withdrawal of said valve assembly away from the valve seat and thereby setting said maximum lift of said valve.

2. The valve of claim 1 wherein said moveable member comprises a threaded bushing threaded on said one of said valve stem and valve body.

3. The valve of claim 2 wherein said first and second engagement means comprise confronting axially facing shoulders.

4. The valve of claim 3 wherein said shoulder on said bushing is formed by an end of said bushing.

5. The valve of claim 2 wherein said adjustment means further includes means locking said threaded bushing from axial movement once its axial position has been set to provide a selected maximum lift.

6. The valve of claim 5 wherein said means locking said threaded bushing comprises a thread adhesive applied to threads of said threaded bushing.

7. The valve of claim 1 wherein said first engagement means and said second engagement means comprise confronting axially facing shoulders.

8. The valve of claim 1 wherein said one of said valve stem and valve body is said valve body on which said moveable member is positioned.

9. The valve of claim 8 wherein said axial bore in said valve body has a counter bore which is threaded and which forms an annular ledge, and said valve body includes a bonnet having an external thread which threads into said threaded counterbore and clamps said diaphragm against said annular ledge, said bonnet also having an internal thread, and wherein said moveable member comprises a bushing with an external thread which is threaded into the internal thread in said bonnet to position said bushing axially.

10. The valve of claim 9 wherein said first engagement means comprises a shoulder on said bushing and said second engagement means comprises a radial shoulder on said valve stem.

11. The valve of claim 10 wherein said shoulder on said bushing is formed by an end of said bushing.

12. The valve of claim 10 wherein said adjustment means further includes means locking said bushing axially in said bonnet at a position providing a selected lift of said valve.

13. The valve of claim 12 wherein said means locking said bushing comprises a thread adhesive.

14. The valve of claim 13 wherein said shoulder on said bushing is provided by an end wall of said bushing.

* * * * *